United States Patent
Lin (10) Patent No.: US 9,365,002 B2
(45) Date of Patent: Jun. 14, 2016

(54) BACKLIGHT MODULE AND MANUFACTURING METHOD OF THE SAME

(71) Applicant: HON HAI PRECISION INDUSTRY CO., LTD., New Taipei (TW)

(72) Inventor: Chen-Han Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 66 days.

(21) Appl. No.: 14/140,575

(22) Filed: Dec. 26, 2013

(65) Prior Publication Data

US 2014/0286042 A1   Sep. 25, 2014

(30) Foreign Application Priority Data

Mar. 21, 2013   (TW) .............. 102110002 A (51) Int. Cl.
 *B29D 11/00* (2006.01)
 *F21V 8/00* (2006.01)

(52) U.S. Cl.
 CPC ........ *B29D 11/00663* (2013.01); *G02B 6/0013* (2013.01); *G02B 6/0065* (2013.01); *G02B 6/002* (2013.01); *G02B 6/0068* (2013.01); *G02B 6/0073* (2013.01); *Y10T 29/49002* (2015.01)

(58) Field of Classification Search
 IPC ................ G02B 6/0065,6/0013, 6/002, 6/0068, G02B 6/0073; Y10T 29/49002; B29D 11/00663
 See application file for complete search history.

(56) References Cited

U.S. PATENT DOCUMENTS

| | | | |
|---|---|---|---|
| 5,762,836 A * | 6/1998 | Bos et al. | 264/1.7 |
| 2010/0080008 A1* | 4/2010 | Abiru | 362/351 |
| 2013/0135896 A1* | 5/2013 | Kuo | 362/609 |

* cited by examiner

*Primary Examiner* — Mathieu Vargot
(74) *Attorney, Agent, or Firm* — Novak Druce Connolly Bove + Quigg LLP (57) ABSTRACT

An exemplary backlight module includes a light guide film and a light bar. The light guide film includes a top surface, a bottom surface, and a light incident surface connected between the top surface and the bottom surface. The light bar includes a light-emitting surface. The light-emitting surface is attached to the light incident surface. A method for manufacturing the backlight module is also provided.

5 Claims, 10 Drawing Sheets

BACKLIGHT MODULE AND MANUFACTURING METHOD OF THE SAME

BACKGROUND

1. Technical Field

The present disclosure relates to backlight modules of liquid crystal displays (LCDs), and to methods of manufacturing backlight modules.

2. Description of Related Art

A typical backlight module comprises a light guide plate and a light source. The light guide plate comprises a light incident surface. The light source faces the light incident surface. However, a gap exists between the light source and the light incident surface, and so some light emitted from the light source is liable to leak through the gap to the outside, which reduces a brightness of the backlight module.

Therefore, it is desirable to provide a backlight module and a method for manufacturing the backlight module to overcome the above-mentioned problems.

DETAILED DESCRIPTION

Figure 1:
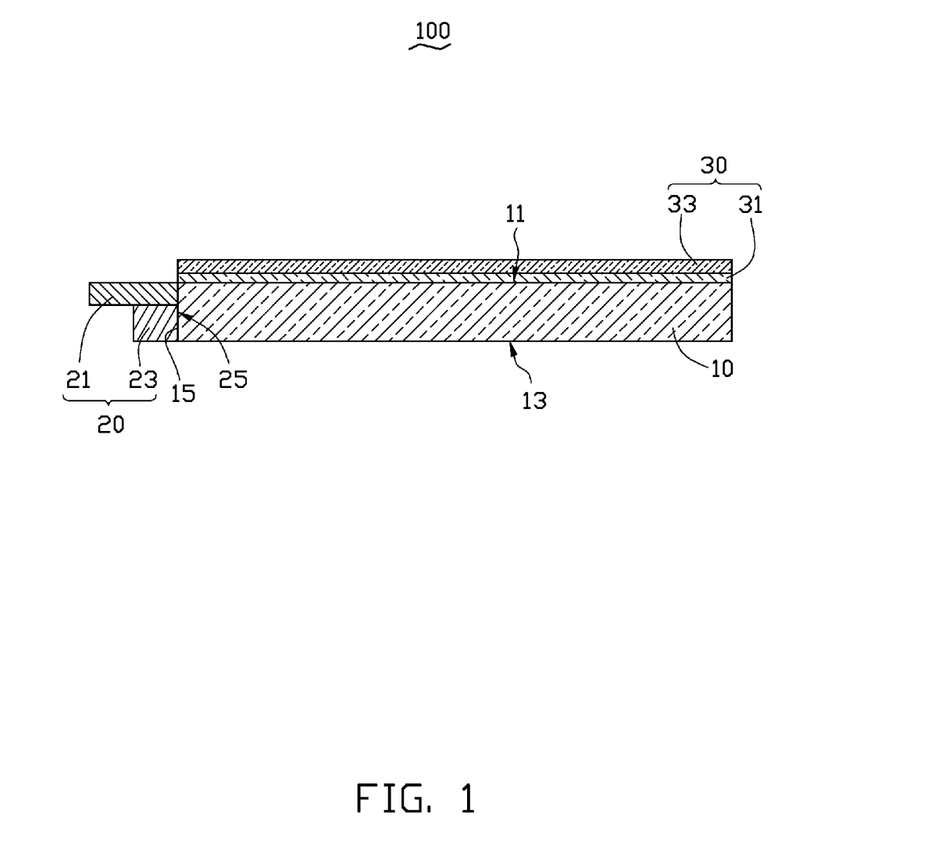
FIG. 1 is a side cross-sectional view of a first embodiment of a backlight module comprising a light bar.
Figure 2:
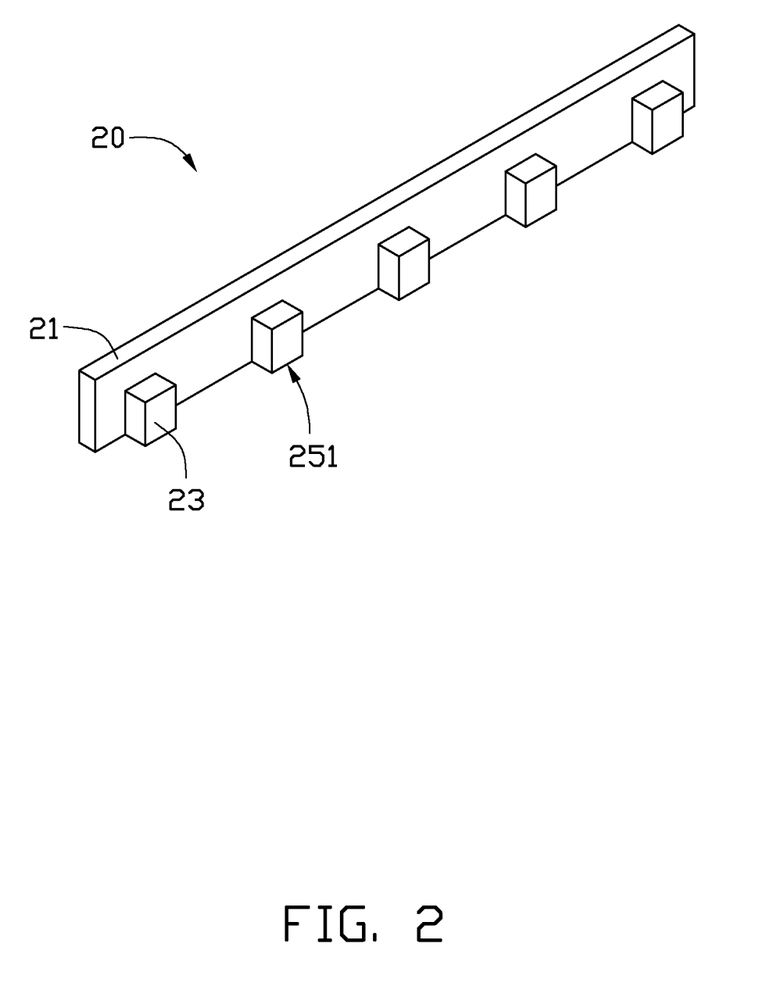
FIG. 2 is a schematic, isometric view of the light bar of the backlight module of the first embodiment.

FIGS. 1-2 show a first embodiment of a backlight module 100. The backlight module 100 comprises a light guide film 10, a light bar 20, and an optical film group 30.

The light guide film 10 is substantially a rectangular plate and comprises a top surface 11, a bottom surface 13, and a light incident surface 15 connected substantially perpendicularly between the top surface 11 and the bottom surface 13.

Referring also to FIG. 2, the light bar 20 comprises a printed circuit board (PCB) 21 and a number of light sources 23 evenly spaced apart on the PCB 21. In this embodiment, the light sources 23 are light-emitting diodes (LEDs). The light bar 20 defines a light-emitting surface 25. Each light source 23 comprises a light-emitting portion 251, and the light emitting portions 251 cooperatively form the light emitting surface 25. That is, the light emitting surface 25 is discontinuous. The light incident surface 15 is directly attached to the light emitting surface 25 by a molding process (see below).

The optical film group 30 is arranged on the top surface 11. The optical film group 30 comprises a diffusing film 31 and a brightness enhancement film 33. The diffusing film 31 is sandwiched between the light guide film 10 and the brightness enhancement film 33.

In summary, in the backlight module 100, the light incident surface 15 is directly attached to the light emitting surface 25. There are no gaps between the light sources 23 and the light incident surface 15, and so loss of light associated with gaps is prevented.

Figure 3:
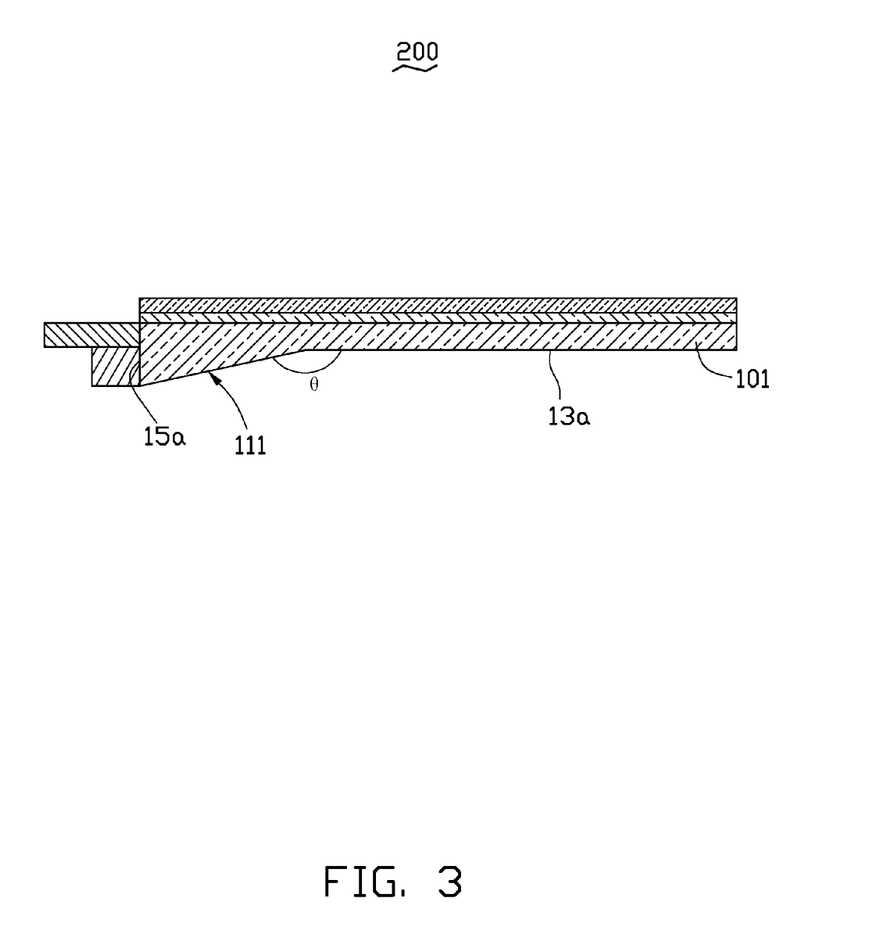
FIG. 3 is a cross-sectional view of a second embodiment of a backlight module.

FIG. 3 shows a second embodiment of a backlight module 200. The difference between the backlight module 200 and the backlight module 100 of the first embodiment is that a light guide film 101 of the backlight module 200 forms a thickened wedge portion at one end thereof. Thus the light guide film 101 comprises an inclined surface 111, which is slantingly connected between a light incident surface 15a and a bottom surface 13a. An angle θ between the inclined surface 111 and the bottom surface 13a is typically more than 170°.

Figure 4:
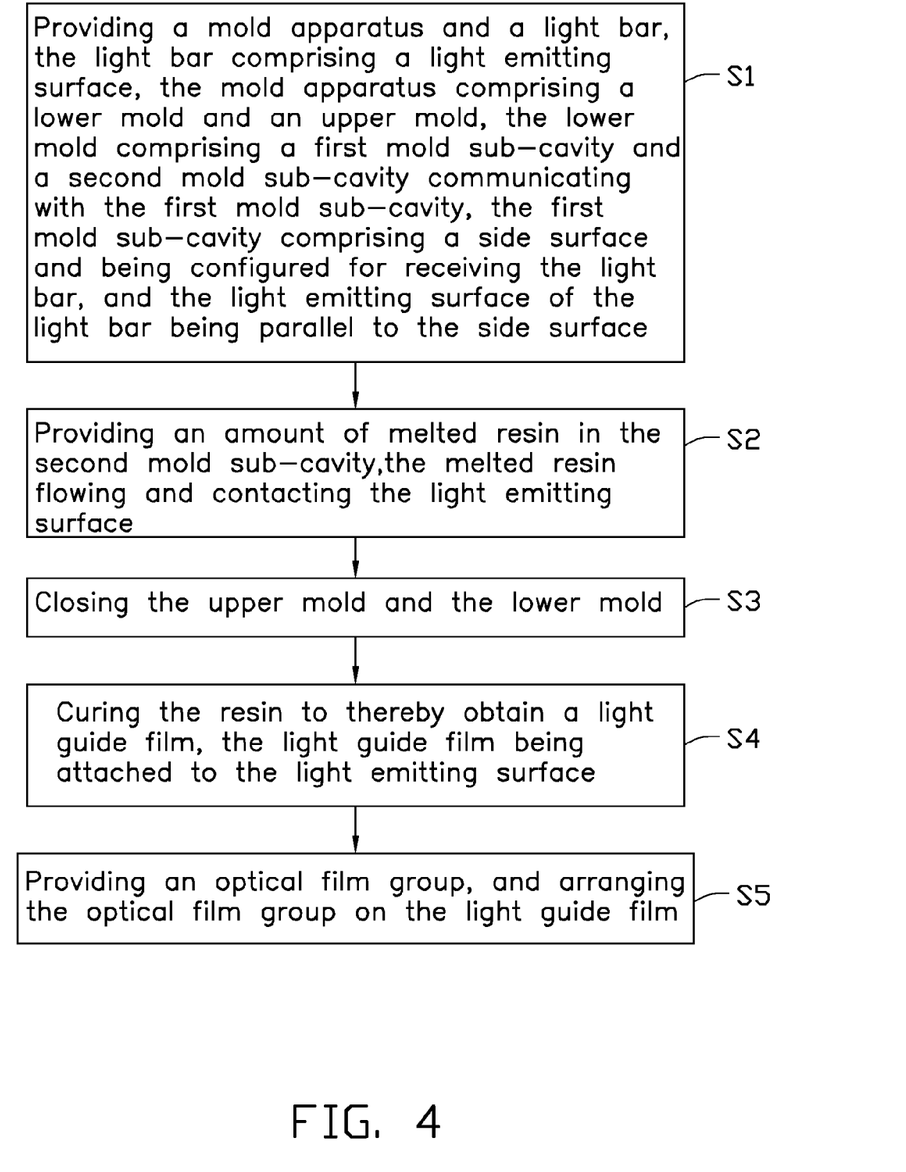
FIG. 4 is a flowchart of a method for manufacturing the backlight module of the first embodiment.
Figure 5:
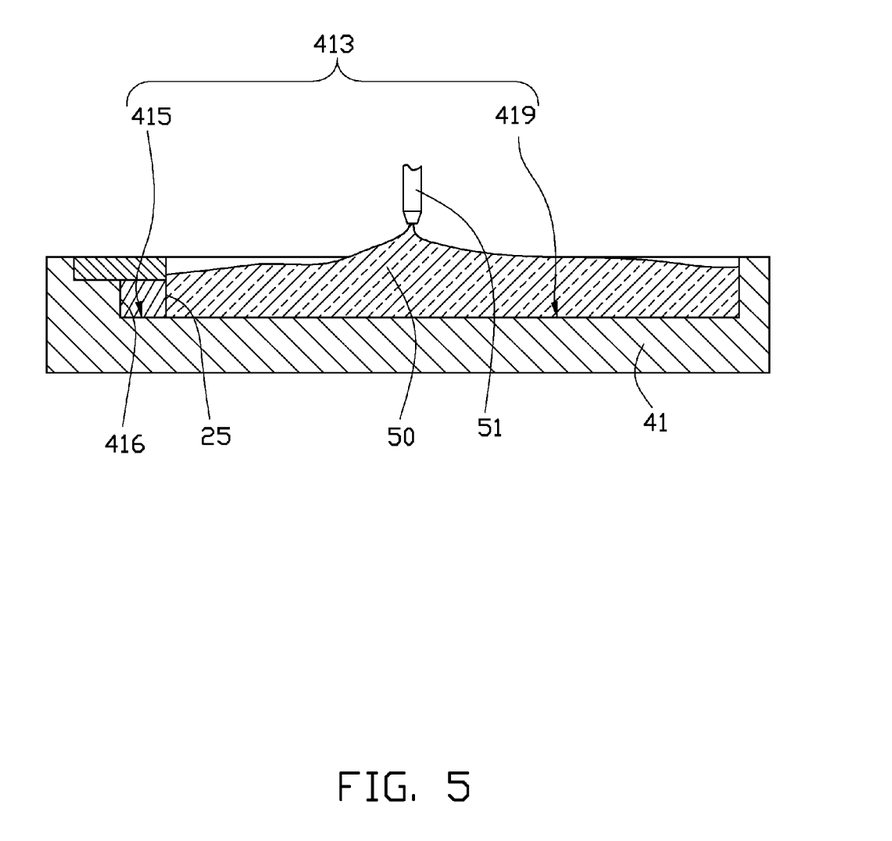
FIG. 5 is a schematic view showing a stage for providing melted resin in a method for manufacturing the backlight module of the first embodiment.
Figure 6:
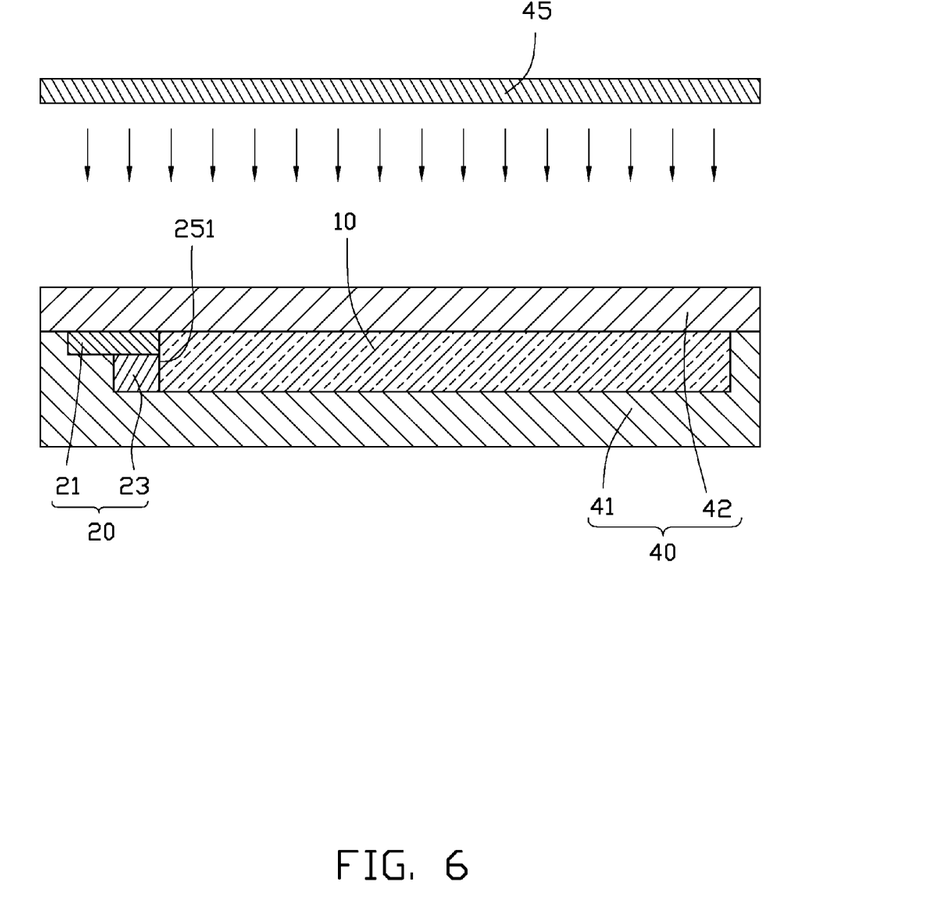
FIG. 6 is a schematic view showing a stage for curing melted resin in a method for manufacturing the backlight module of the first embodiment.

FIGS. 4-6 show successive stages in a method for manufacturing the backlight module 100 of the first embodiment. The method comprises the following steps.

Step S1: a mold apparatus 40 and a light bar 20 are provided. The mold apparatus 40 comprises a lower mold 41 and an upper mold 42. The lower mold 41 comprises a first mold sub-cavity 415, and a second mold sub-cavity 419 communicating with the first mold sub-cavity 415. The first mold sub-cavity 415 and the second mold sub-cavity 419 cooperatively define a mold cavity 413. The first mold sub-cavity 415 is bounded by a side surface 416 of the lower mold 41. The first mold sub-cavity 415 is configured for receiving the light bar 20. When the first mold sub-cavity 415 receives the light bar 20, the light emitting surface 25 of the light bar 20 is substantially parallel to the side surface 416. The mold cavity 413 is configured for molding the light guide film 10.

Step S2: a melted resin 50 is fed into the second mold sub-cavity 419. The melted resin 50 flows and fills in gaps between each two adjacent light sources 23 and contacts the light emitting surface 25. In this embodiment, a feed nozzle 51 provides the melted resin 50.

Step S3: the upper mold 42 and the lower mold 41 are sealed.

Step S4: a curing device 45 emits ultraviolet (UV) light (shown with arrows in FIG. 5) to cure the resin 50 to obtain the light guide film 10. The light guide film 10 is thus directly adhered to the light bar 20, with the light incident surface 15 directly adhered to the light emitting surface 25 (see FIG. 6). Put another way, the light guide film 10 is thus fused to the light bar 20, with the light incident surface 15 fused to the light emitting surface 25. A gapless interface between the light emitting surface 25 and the light incident surface 15 is achieved solely by dint of the fusion therebetween.

Step S5: an optical film group 30 is provided, and the optical film group 30 is arranged on the top surface 11. The optical film group 30 comprises a diffusing film 31 and a brightness enhancement film 33. The diffusing film 31 is located between the light guide film 10 and the brightness enhancement film 33. Thus, the backlight module 100 is obtained (see FIG. 1).

Figure 7:
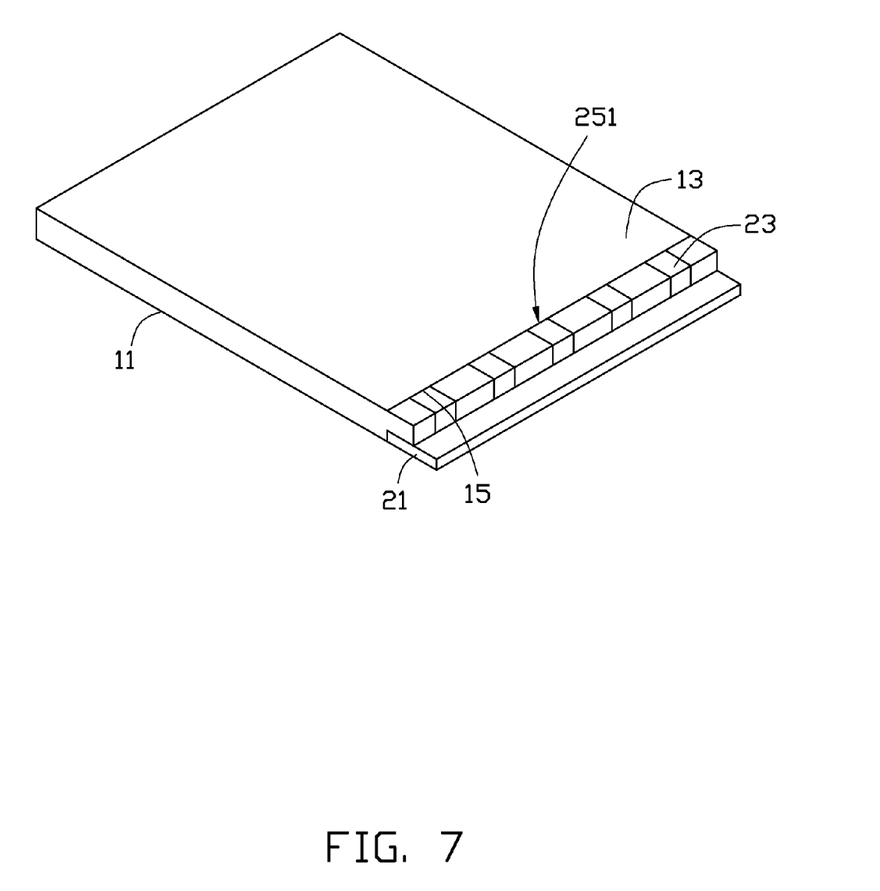
FIG. 7 is a schematic view showing the backlight module of the first embodiment.
Figure 8:
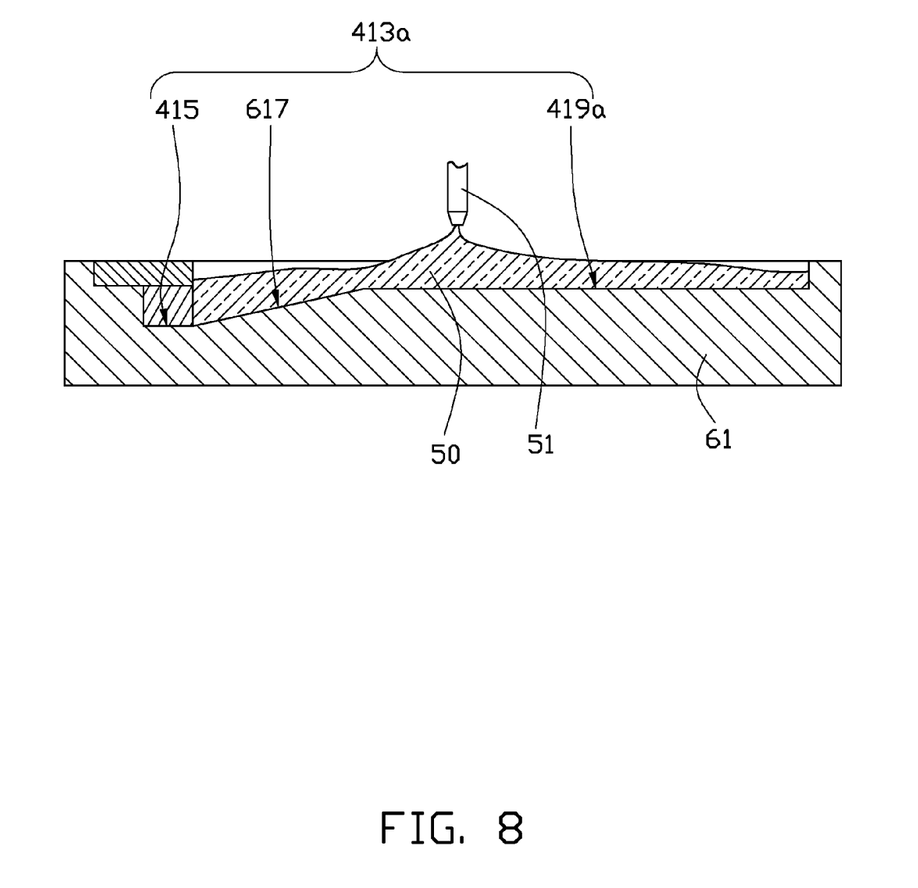
FIG. 8 is a schematic view showing a stage for providing melted resin in a method for manufacturing the backlight module of the second embodiment.
Figure 9:
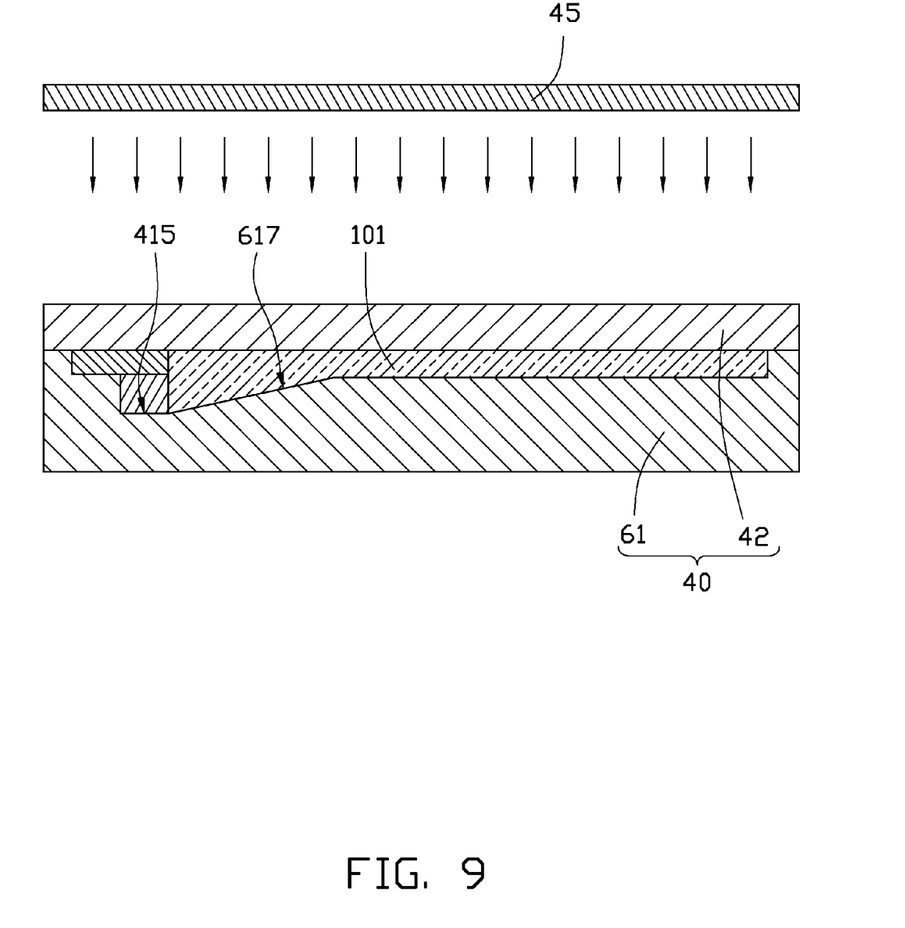
FIG. 9 is a schematic view showing a stage for cure melted resin in a method for manufacturing the backlight module of the second embodiment.
Figure 10:
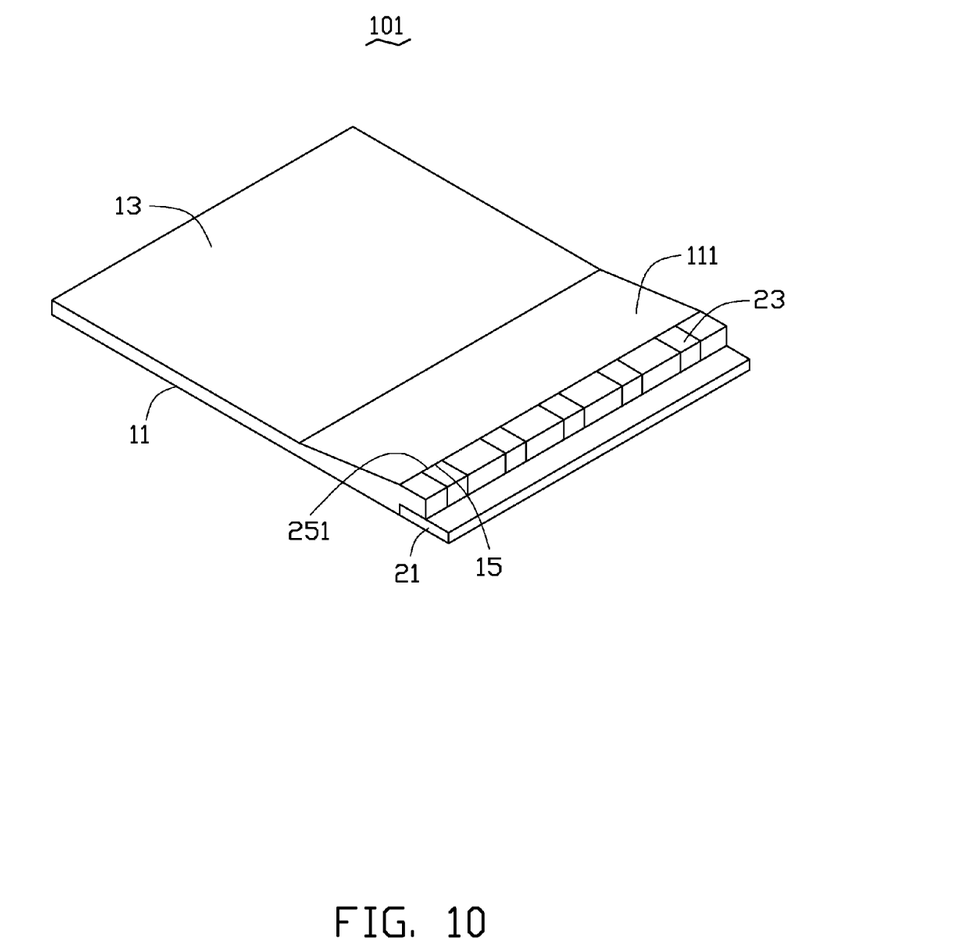
FIG. 10 is a schematic view showing the backlight module of the second embodiment.

FIGS. 7-9 show a method for manufacturing the backlight module 200 of the second embodiment. The difference between the method for manufacturing the backlight module 200 and the method for manufacturing the backlight module 100 is that in step S1, for manufacturing the backlight module 200, a mold cavity 413*a* of a lower mold 61 further comprises an inclined surface 617. The inclined surface 617 bounds part of a second mold sub-cavity 419*a*, and is adjacent to a first mold sub-cavity 415. The inclined surface 617 is configured for forming the inclined surface 111 of the light guide film 101.

It is to be understood that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A method for manufacturing a backlight module, comprising:

providing a mold apparatus and a light bar, the light bar comprising a light emitting surface, the mold apparatus comprising a lower mold and an upper mold, the lower mold comprising a first mold sub-cavity and a second mold sub-cavity communicating with the first mold sub-cavity, the first mold sub-cavity comprising a side surface and receiving the light bar, with the light emitting surface of the light bar being parallel to the side surface;

providing an amount of melted resin in the second mold sub-cavity, the melted resin flowing and contacting the light emitting surface;

closing the upper mold and the lower mold; and curing the resin to thereby obtain a light guide film, the light guide film comprising a top surface, a bottom surface, and a light incident surface connecting the top surface and the bottom surface, the light incident surface being directly attached to the light emitting surface.

2. The method of claim 1, further comprising arranging an optical film group on the top surface of the light guide film.

3. The method of claim 2, wherein the optical film group comprises a diffusing film and a brightness enhancement film, and the diffusing film is located between the light guide film and the brightness enhancement film.

4. The method of claim 1, wherein the lower mold further comprises an inclined surface, and the inclined surface is formed between the first mold sub-cavity and the second mold sub-cavity.

5. The method of claim 1, wherein the resin is cured with an ultraviolet (UV) light curing device.

\* \* \* \* \*